Oct. 6, 1964     F. FETRIN     3,151,889
PIPE COUPLING HAVING CENTERING MEANS
Filed Dec. 8, 1959
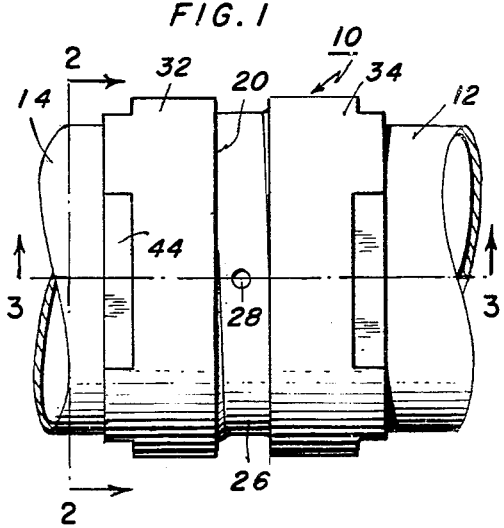
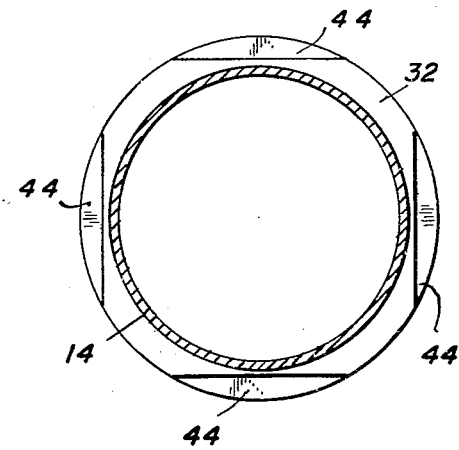
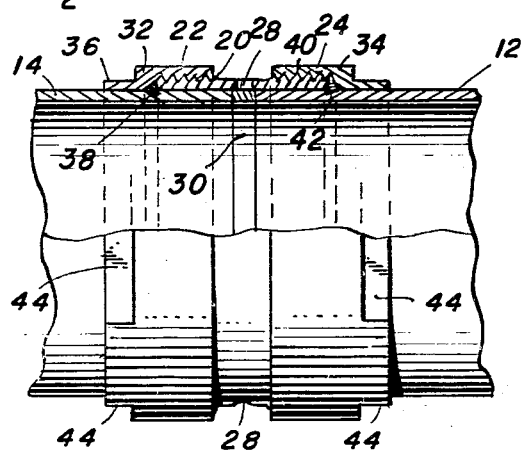
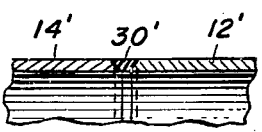
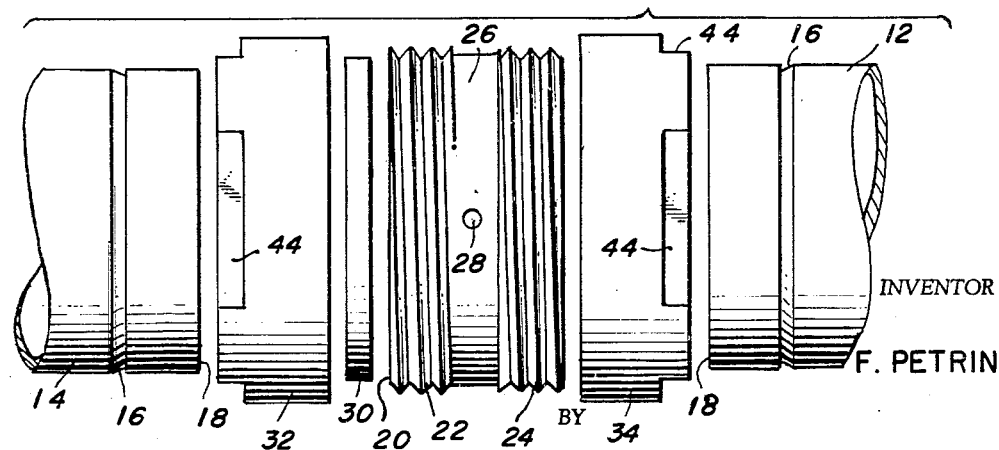
INVENTOR
F. PETRIN

United States Patent Office 3,151,889
Patented Oct. 6, 1964

3,151,889
PIPE COUPLING HAVING CENTERING MEANS
Frank Petrin, 4211 Ithaca St., Elmhurst,
Long Island, N.Y.
Filed Dec. 8, 1959, Ser. No. 858,158
1 Claim. (Cl. 285—39)

The present invention generally relates to a pipe fitting and more particularly to a coupling assembly for detachably interconnecting adjacent aligned pipe ends without requiring the formation of threads on the pipe ends.

The primary object of the present invention is to provide a pipe coupling for use in a milkpipe assembly for joining the ends of aligned pipe sections without rotation of the pipe sections and without requiring the formation of threads on the ends of the pipe sections.

Briefly, the present invention incorporates a pipe nipple externally and oppositely threaded on its end portions with the nipple telescopically receiving the smooth end portions of the pipe sections. A pair of internally threaded members are threadedly engaged with the nipple and rotatably retained on the pipe sections by virture of a split spring ring received in a groove in the pipe section and engaging an internal shoulder in the internally threaded member. An annular ring member is disposed within the nipple and the ends of the pipe sections abuttingly engage opposite ends of the ring member and the pipe sections and ring member are of constant internal diameter.

A further object of the invention is to provide a coupling which has a smooth bore therethrough, and no gap or space between the coupled pipes to catch and hold foreign matter and material being transmitted through the pipe, thus facilitating cleanliness in the pipe.

A further object of the present invention is to provide a pipe coupling which is simple in construction, easy to use in many orientations, long lasting and generally inexpensive to manufacture.

These objects I accomplish by means of such structure and relative arrangement of parts thereof, as will fully appear by a perusal of the description below and by various specific features which will be hereinafter set forth.

To the above cited and other ends and with the foregoing and various other novel features and advantages and other objects of my invention as will become more readily apparent as the description proceeds, my invention consists in certain novel features of construction and the combination and arrangement of parts as will be hereinafter more particularly pointed out in the claim hereunto annexed and more fully described and referred to in connection with the accompanying drawings wherein:

FIGURE 1 is a side elevational view of the pipe coupling of the present invention;

FIGURE 2 is a transverse, sectional view taken substantially upon a plane passing generally along section line 2—2 of FIGURE 1;

FIGURE 3 is a partial longitudinal sectional view of the coupling taken generally along section line 3—3 on FIGURE 1 and illustrating the structural details thereof;

FIGURE 4 is an exploded side elevation view of the components of the coupling;

FIGURE 5 is a fragmental sectional view showing a double tapered connector ring.

In the above mentioned drawings annexed hereto and forming a part of this specification, I have shown but one embodiment of my invention which is deemed preferable, but it is to be understood that changes and modifications may be made without departing from the spirit of the invention.

Referring now to the different drawings more in detail, in which similar characters of reference indicate corresponding parts in all the figures and referring more particularly to the preferred form of my invention selected for illustrative purposes, the numeral 10 generally designates the pipe coupling of the present invention for joining the adjacent aligned ends of pipe sections 12 and 14 provided with smooth inner and outer surfaces except for a peripheral groove 16 in spaced relation to the flat end 18.

The coupling 10 includes a cylindrical pipe nipple 20 having a smooth inner surface telescopically and closely receiving the end portions of the pipe sections 12 and 14. The outer surface of the nipple 20 is provided with opposite external threaded portions 22 and 24 on the outer ends thereof with the threaded portions extending beyond the intermediate outer surface portion 26 of the nipple 20. The intermediate portion 26 is provided with a pair of radially extending openings 28 therein. These openings are for the insertion of a special tool for additional tightening or loosening of the coupling if necessary, and also to provide areas of expansion for ring 30 if too tightly compressed. An annular ring 30 is disposed in the nipple in frictional engagement with the inner surface of the nipple and abuttingly engages the flat ends of the pipe sections 12 and 14. The internal diameter of the pipe sections 12 and 14 is the same as the ring 30 thereby providing a smooth constant diameter pipe coupling for uninterrupted flow of material therethrough when the pipe sections 12 and 14 are pulled tight against the ring 30.

A pair of internally threaded members 32 and 34 generally in the form of nuts are threadedly engaged with the externally threaded portions 22 and 24 of the nipple 20. Each member 32 and 34 is provided with an inwardly offset peripheral outer end portion 36 which forms a peripheral internal shoulder 38 at its juncture with the threaded portion 40. The shoulder engages the flat outer edge of a split spring ring 42 disposed in the groove 16 in the respective pipe sections. The external surface of the offset portion 36 is provided with flattened areas 44 to facilitate the rotation of the members 32 and 34 by providing a gripping area for receiving a turning instrument such as a wrench or the like.

The engaging surfaces of the split spring ring 42 and shoulder 38 are inclined for camming the split spring ring into the groove 16. The outer edge of the groove 16 is inclined as is the corresponding inner surface of the split spring ring thus further facilitating the locking of the members 32 and 34 to the pipe sections. This assembly also enables the removal of the spring rings and annular members 32 and 34 for disassembly, repair and the like. The structure of the present invention is primarily adapted for use in milk conduits and is constructed of a smooth finish non-toxic metal such as stainless steel or the like which is easily sterilized and maintained in sanitary condition. The smooth inner surface of the coupling eliminates the possibility of milk particles being lodged in any crevices or spaces therewithin.

As illustrated in FIGURE 5, the connection ring 30' may be made from neoprene, Teflon, nylon, copper and similar products. The ring 30' is provided with tapered or inclined end edges which diverge outwardly in correspondence with the inclined end edges on pipe sections 14' and 12'. This structure forms a better seal and also prevents the ring or gasket from deforming inwardly when the clamp nuts are tightened.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claim.

What I claim is:

A coupling for the repeated assembly and disassembly of the end portions of pipe sections of the type arranged to be assembled in end to end relationship with an annular resilient packing ring therebetween and in which each pipe section has smooth uniform diameter inner and outer surfaces and an annular groove formed exteriorly thereof in spaced relation to the end of the pipe, said annular groove having a bottom wall inclined at an angle inwardly from the outer surface of the pipe and extending from the outer pipe surface toward a shoulder in the body of the pipe arranged substantially at right angles to the outer surface of the pipe whereby the depth of the portion of the groove nearest to the end of the pipe is greater than the depth of the other end of the groove, a split ring in each said groove, said split ring having an external diameter greater than the external diameter of said pipe section and having a straight vertical side arranged to abut the shoulder in the body of the pipe and an inclined opposite side presenting an inclined abutment encircling the exterior of the pipe, a cylindrical pipe nipple having a smooth inner surface telescopically and closely receiving the end portions of said pipe sections, said nipple having vertical end faces and having a length not exceeding the distance separating the split rings on said pipe sections when the pipe sections are arranged in end to end relationship, said nipple having external threaded portions on the outer ends thereof and an intermediate annular substantially plain surface of lesser diameter than said threaded portions, and having spaced apertures around the periphery thereof and extending completely therethrough to permit radial expansion of said packing ring when the latter is compressed and to provide for engagement by a tool, and a pair of sleeves, one for each pipe section, each sleeve having an internally threaded section arranged at one end for threaded engaging the externally threaded portion on an end of said nipple, each sleeve having its other end portion closely receiving said pipe section and having an internal inclined shoulder arranged to engage the oppositely inclined abutment provided by said split ring in camming relation whereby the split ring is operated against the inclined wall of said groove and said shoulder to draw the pipe sections into fluid tight engagement, each shoulder being equidistant from the end of its associated pipe section, whereby a self-centering effect is achieved upon tightening of said sleeves.

References Cited in the file of this patent
UNITED STATES PATENTS

| | | |
|---|---|---|
| 199,784 | Brumbaugh | Jan. 24, 1878 |
| 342,305 | Nuttall | May 18, 1886 |
| 1,506,564 | Cattoni | Aug. 26, 1924 |
| 1,703,696 | Stratford | Feb. 26, 1929 |
| 2,211,776 | Haury | Aug. 20, 1940 |
| 2,253,018 | Cowles | Aug. 19, 1941 |
| 2,570,224 | Fason | Oct. 9, 1951 |
| 2,761,702 | Noel | Sept. 4, 1956 |